United States Patent
Barton

(10) Patent No.: US 7,469,577 B2
(45) Date of Patent: Dec. 30, 2008

(54) METHOD OF DIAGNOSING TURBOCHARGERS FOR INTERNAL COMBUSTION ENGINES

(75) Inventor: Jason Thomas Barton, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 110 days.

(21) Appl. No.: 11/713,502

(22) Filed: Mar. 2, 2007

(65) Prior Publication Data

US 2008/0236266 A1    Oct. 2, 2008

(51) Int. Cl.
*G01M 15/00* (2006.01)
(52) U.S. Cl. .................................. 73/114.77
(58) Field of Classification Search ............ 73/112.01, 73/112.05, 114.33, 114.37, 114.77, 118.01, 73/118.02
See application file for complete search history.

(56) References Cited

U.S. PATENT DOCUMENTS

| | | | |
|---|---|---|---|
| 4,046,003 A | 9/1977 | Armstrong et al. | |
| 4,277,830 A | 7/1981 | Reid et al. | |
| 4,334,427 A | 6/1982 | Armstrong | |
| 6,298,718 B1 * | 10/2001 | Wang | 73/114.01 |
| 6,990,814 B2 * | 1/2006 | Boley et al. | 60/611 |
| 7,104,120 B2 * | 9/2006 | Gladden | 73/114.77 |
| 7,278,302 B2 * | 10/2007 | Rohde | 73/114.01 |
| 7,380,445 B2 * | 6/2008 | Wood | 73/114.39 |
| 2005/0193810 A1 * | 9/2005 | Gladden | 73/119 R |
| 2008/0011070 A1 * | 1/2008 | Wood | 73/118.1 |

* cited by examiner

*Primary Examiner*—Eric S McCall
(74) *Attorney, Agent, or Firm*—Reising, Ethington, Barnes, Kisselle, P.C.

(57) ABSTRACT

A method for diagnosing a turbocharger (10) includes disconnecting the compressor outlet conduit (26) so that the engine (12) is naturally aspirated and using the engine to drive the turbine (14) of the turbocharger. The compressor outlet conduit (26) has a restriction (28) to create a backpressure which is measured along with the inlet pressure, barometric pressure and ambient temperature. The flow rate is determined and compared to acceptable parameters from a map data provided by a turbocharger manufacturer to diagnose if the turbocharger is operating within the acceptable parameters.

5 Claims, 1 Drawing Sheet

METHOD OF DIAGNOSING TURBOCHARGERS FOR INTERNAL COMBUSTION ENGINES

TECHNICAL FIELD

The field of this invention relates to diagnosing turbochargers for vehicular engines.

BACKGROUND OF THE DISCLOSURE

Internal combustion engines, particularly diesel engines are now commonly provided with turbochargers for enhancing the engine performance. When a engine feels sluggish and there is sub par performance, the turbocharger is often the first component suspected and it is often replaced without full diagnosis.

This quick replacement occurs more frequently, when the turbocharger is on a diesel engine of a motor vehicle that is at a remote service center. The turbocharger is often replaced under warranty and sent back to the manufacturer under warranty claims. When the turbocharger is tested after its return, it is often found that there was no problem with the turbocharger and the performance problems of the diesel engine were caused by other reasons and/or other components. Hence, needless expense, time and effort is wasted because there is no adequate in-field diagnosis for a turbocharger.

While it is known to diagnose a turbocharger while still mounted in place on the engine, the prior art diagnostic methods often require complicated electronic and computer equipment to make mathematical determinations and curves interpretations. Such equipment is often not available at all remote or distant service centers.

What is needed is an expeditious field test to determine if a turbocharger is performing according to acceptable parameters using expeditious readings of barometric pressure, ambient temperature, and turbine speed. What is also needed is a method of diagnosing the turbocharger while its housing is still mounted in place in a motor vehicle engine compartment by comparing performance results with a manufacturer's map of acceptable performance.

SUMMARY OF THE DISCLOSURE

In accordance with one aspect of the invention, a method of testing a turbocharger to determine if its performance is within acceptable parameters includes the steps of running an engine with its intake manifold not taking air in from a compressor of the turbocharger; providing energy to drive a turbine of the turbocharger from exhaust gases of the engine; opening a compressor outlet of the turbocharger to ambient and providing a restriction within the compressor outlet to raise the pressure in the compressor outlet. One then measures outlet pressure at the compressor outlet upstream of the restriction; measures inlet pressure at the compressor inlet, measures the turbocharger rotational speed, calculates a compressor pressure ratio from the measured outlet pressure and inlet pressure and compares the ratio to map data of the turbocharger to determine if the turbocharger is operating within the acceptable parameters.

Preferably, the method also includes measuring the ambient air temperature and the barometric pressure and compensating the calculation of the compressor ratio to a comparable figure at standard temperature and pressure before comparing it to the map data at standard temperature and pressure. Desirably, the turbocharger has a variable geometry and one takes measurements at different geometries of the turbocharger.

According to another aspect of the invention, a method for field testing a turbocharger on an engine to determine if the turbocharger performance is within acceptable parameters includes the steps of: disconnecting a compressor outlet of the turbocharger so that the engine is naturally aspirated, providing energy to drive a turbine of the turbocharger from the exhaust gases of the engine and placing a restriction downstream in a compressor outlet of the turbocharger. One then measures outlet pressure and temperature at the compressor outlet upstream of the restriction, measures inlet pressure and temperature at an inlet of the turbocharger, measures the ambient barometric pressure, measuring the turbocharger rotational speed, calculates a compressor pressure ratio from the measured outlet pressure, inlet pressure, temperature and ambient barometric pressure and compares the ratio to map data for the turbocharger to determine if the turbocharger is operating within the acceptable parameters.

BRIEF DESCRIPTION OF THE DRAWINGS

Reference now is made to the accompanying drawings in which.

DETAILED DESCRIPTION OF THE PREFERRED EMBODIMENT

Figure 1:
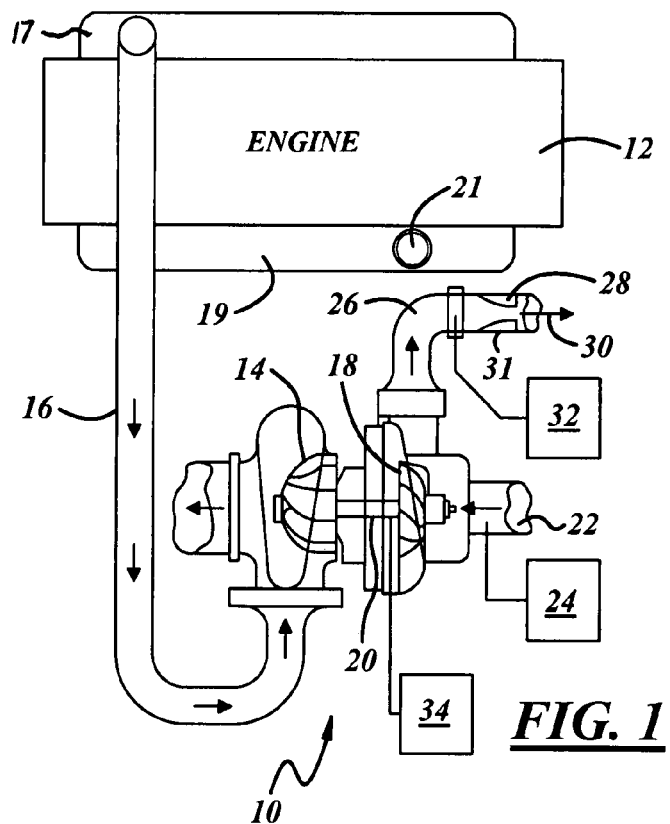
FIG. 1 is a schematic view of a turbocharger ready for an in field diagnostic test with its engine according to one embodiment of the invention.

Referring now to FIG. 1, a test for a turbocharger 10 can be conducted on site with the turbocharger 10 still in position for example within an engine compartment of a vehicle in proximity to an engine 12 such as a diesel engine.

The turbocharger 10 has it turbine 14 operably connected to the engine through an exhaust port 16 from exhaust manifold 17 to receive the exhaust gasses from the engine to drive the turbine 14. The turbine 14 is connected to the compressor 18 through the turbo shaft 20.

The compressor inlet 22 has a sensor 24 for measuring the inlet pressure and temperature. The ambient barometric pressure is also measured. The compressor outlet conduit 26 is operably disconnected from the engine intake manifold 19 such as from port 21 such that the engine becomes normally aspirated and draws in ambient air as it operates. The compressor outlet conduit 26 has a restriction 28 placed before its distal open end 30 to provide a pressure increase in the compressor outlet conduit 26 that can be measured. The restriction 28 may be included in a separate conduit member 31 attachable to the compressor outlet conduit 26. A sensor 32 is positioned upstream of the restriction 28 to measure the outlet pressure and the temperature. There is also a sensor 34 to measure the speed of the turbo shaft 20.

The test may be conducted at different speeds of the engine, such as at 1000 revolutions per minute (rpm), 1200 rpm, or 1600 rpm. Using the measured compressor inlet pressure, the measured compressor outlet pressure, the inlet temperature, and the barometric pressure, a compressor pressure ratio is conventionally calculated which then is converted to a flow rate measurement and then compared to the turbocharger manufacturer's compressor map data. The inlet temperature and barometric measurements are used to adjust the flow rate and to compensate against the manufacturer's compressor map data that is conventionally measured and recorded at a standard temperature and atmospheric pressure. In this way, a valid comparison is made between a map at standard temperature and pressure and in-field conditions which may have pressures and temperatures widely varying from standard temperatures and pressures.

The final flow rate is compared against the turbocharger manufacturer's minimum and maximum production flow rates to determine if the tested turbocharger is within specifications. If it is not within acceptable parameters, the turbocharger can then be replaced with the assurance that it is the cause of the diesel engine sub par performance.

If a variable geometry turbocharger is tested at the three illustrated speeds, there will be different compressor pressure ratios with different turbocharger speeds depending on the varied geometry of the turbocharger. The three curves for the three engine speeds 1,000 rpm, 1,200 rpm and 1,600 rpm are shown and may overlap as shown in FIG. 2.

If a specific turbocharger that is being tested has no varied geometry, its test at the three engine speeds will produce, only three plotted points, i.e. a single plot point for each engine speed. So for example, with the engine at 1,000 rpm, 1,200 rpm and 1,600 rpm, only three points will show on the graph along the nominal curve. A minimum acceptable valve and a maximum acceptable valve for the compressor ratio is determined for each turbo speed.

If the tested compressor ratios are below the minimum acceptable values for the tested turbocharger speed or above the maximum acceptable value, the tested turbocharger is then considered not performing within acceptable parameters and needs to be replaced. If the compressor ratio however is within the band created between the minimum acceptable values and the maximum acceptable values, the turbocharger is diagnosed as acceptable and does not need to be replaced. Furthermore, the engine sub par performance can be then determined to be caused by another component or reason.

Figure 2:
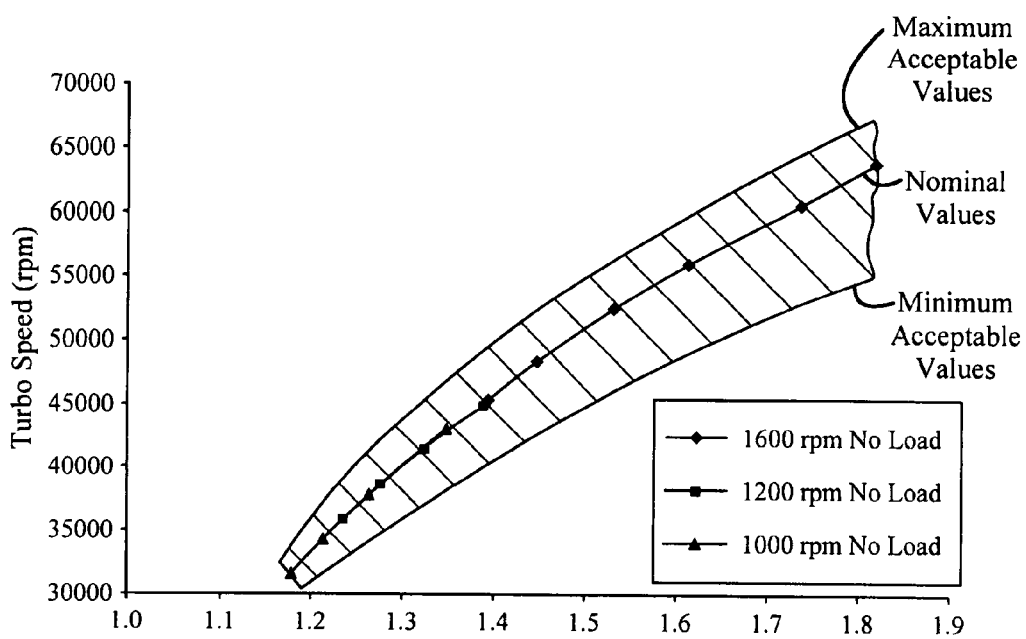
FIG. 2 is a graph illustrating test results using a variable geometry turbocharger showing nominal results for a working turbocharger and with a possible minimum acceptance level and maximum acceptance level schematically shown in comparison.

FIG. 2 is only a representation of one variable geometry turbocharger. The nominal, maximum and minimum acceptable values may vary in accordance with the specific make and model of the turbocharger.

It should be understood that a single service tool may be constructed for use during the diagnosis. The tool may have a compressor inlet tube instrumented for temperature and pressure, with a compressor outlet tube instrumented for temperature and pressure, a barometric pressure sensor and turbo speed adaptor. The turbo speed adaptor is compatible for use on turbochargers that have turbocharger's speed measurement devices built-in or without any such device. If the turbocharger has a built-in speed measuring device, the signal from this device may be used. If there is no built-in speed measuring device, the turbo speed measurement needs to be measured by the service tool.

In this fashion, a turbocharger can be diagnosed and tested in the field to determine if it is working within acceptable parameters before it is replaced.

Variations and modifications are possible without departing from the scope and spirit of the present invention as defined by the appended claims.

The embodiments in which an exclusive property or privilege is claimed are defined as follows:

1. A method of testing a turbocharger to determine if its performance is within acceptable parameters provided by the turbocharger manufacturer; said method comprising:
    running an engine with its intake manifold not taking air in from a compressor of said turbocharger;
    providing energy to drive a turbine of said turbocharger from exhaust gases of said engine;
    opening a compressor outlet of said turbocharger to ambient and providing a restriction within the compressor outlet to raise pressure in the compressor outlet;
    measuring the pressure at the compressor outlet upstream of said restriction;
    measuring inlet pressure at the compressor inlet;
    measuring the turbocharger rotational speed; and
    calculating a compressor pressure ratio from the measured outlet pressure and inlet pressure and comparing said ratio to map data of said turbocharger to determine if said turbocharger is operating within said acceptable parameters.

2. A method of testing turbocharger as defined in claim 1 further comprising:
    measuring the ambient air temperature and the barometric pressure and compensating the calculation of said compressor ratio to a comparable figure at standard temperatures and pressure before comparing it to said map data at standard temperatures and pressure.

3. A method as defined in claim 2 further comprising:
    said turbocharger having a variable geometry and taking measurements at different geometries of said turbocharger.

4. A method as defined in claim 1 further comprising:
    said turbocharger having variable geometry and taking measurements at different geometries of said turbocharger.

5. A method for field testing a turbocharger on an engine to determine if the turbocharger performance is within acceptable parameters; said method comprising:
    disconnecting a compressor outlet of the turbocharger so that the engine is naturally aspirated;
    providing energy to drive a turbine of the turbocharger from the exhaust gases of said engine;
    placing a restriction downstream in a compressor outlet of the turbocharger to raise pressure in the outlet;
    measuring the outlet pressure and temperature at the compressor outlet upstream of the restriction;
    measuring inlet pressure and temperature at an inlet of the turbocharger;
    measuring the ambient barometric pressure;
    measuring the turbocharger rotational speed; and
    calculating a compressor pressure ratio from the measured outlet pressure, inlet pressure, temperatures and ambient barometric pressure and comparing said ratio to map data for said turbocharger to determine if the turbocharger is operating within said acceptable parameters.

* * * * *